(12) United States Patent
Herrero et al.

(10) Patent No.: US 11,493,440 B2
(45) Date of Patent: Nov. 8, 2022

(54) SPECKLE DETECTION SYSTEMS, IMAGE CAPTURING DEVICES AND METHODS

(71) Applicant: FICOSA ADAS, S.L.U., Barcelona (ES)

(72) Inventors: Francisco Remiro Herrero, Barcelona (ES); Jordi Vila Planas, Barcelona (ES); Inigo Salinas Ariz, Barcelona (ES); Carlos Hera Vila, Barcelona (ES); Ignacio Ayora Morante, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 0 days.

(21) Appl. No.: 16/446,889

(22) Filed: Jun. 20, 2019

(65) Prior Publication Data

US 2019/0391075 A1 Dec. 26, 2019

(30) Foreign Application Priority Data

Jun. 20, 2018 (EP) .................................. 18382451

(51) Int. Cl.
*G01N 21/47* (2006.01)
*B60R 11/04* (2006.01)
(Continued)

(52) U.S. Cl.
CPC .......... *G01N 21/4788* (2013.01); *B60R 11/04* (2013.01); *G01N 21/33* (2013.01);
(Continued)

(58) Field of Classification Search
CPC ............... G01N 21/4788; G01N 21/33; G01N 21/3563; G01N 2021/479;
(Continued)

(56) References Cited

U.S. PATENT DOCUMENTS 4,355,271 A    10/1982  Noack
4,981,362 A *  1/1991  deJong ................. G01N 21/534
                                                          250/205

(Continued)

FOREIGN PATENT DOCUMENTS

CN    101981504 A *  2/2011  ......... G03F 7/70808
DE        3203091 A1   8/1983
(Continued)

OTHER PUBLICATIONS

European Search Report dated Nov. 20, 2018 for European Application No. 18382451.5, 8 pgs.

*Primary Examiner* — Peter B Kim
(74) *Attorney, Agent, or Firm* — Brooks Kushman P.C.

(57) ABSTRACT

The present disclosure relates to a speckles detection system for detecting one or more speckles on a surface of an optical element of an image capturing device. The system comprises: one or more light sources configured to emit a light beam towards the optical element, the optical element being configured to reflect light from the light sources when speckles are located on the surface of the optical element. The system further comprises one or more light receivers configured to receive the light beam reflected by the optical elements such that speckles on the surface of the optical elements are detected. Methods for detecting one or more speckles on a surface of an optical element of an image capturing device are also provided.

16 Claims, 5 Drawing Sheets

(51) Int. Cl.
  *G01N 21/33*   (2006.01)
  *G01N 21/3563*  (2014.01)
(52) U.S. Cl.
  CPC ... *G01N 21/3563* (2013.01); *G01N 2021/479* (2013.01); *G01N 2201/1244* (2013.01)
(58) Field of Classification Search
  CPC ........... G01N 2201/1244; G01N 21/94; G01N 21/958; B60R 11/04; B60S 1/0844; G02B 27/0006
  See application file for complete search history.

(56) References Cited

U.S. PATENT DOCUMENTS

| | | | | |
|---|---|---|---|---|
| 5,560,245 | A | * | 10/1996 | Zettler ................ B60S 1/0822 73/335.01 |
| 2003/0193604 | A1 | * | 10/2003 | Robins ................ H04N 5/2254 348/335 |
| 2007/0132989 | A1 | | 6/2007 | Kaller et al. |
| 2012/0019904 | A1 | * | 1/2012 | Inoue ............... H01L 31/02325 359/350 |
| 2013/0258321 | A1 | * | 10/2013 | Ju ....................... G01N 21/958 356/73 |
| 2017/0313288 | A1 | * | 11/2017 | Tippy .................. B60R 1/0602 |
| 2019/0325603 | A1 | * | 10/2019 | Nogimori .......... G06K 9/00838 |

FOREIGN PATENT DOCUMENTS

| | | |
|---|---|---|
| DE | 10019112 A1 | 8/2001 |
| KR | 20180002244 A | 1/2018 |

* cited by examiner

SPECKLE DETECTION SYSTEMS, IMAGE CAPTURING DEVICES AND METHODS

CROSS-REFERENCE TO RELATED APPLICATIONS

This application claims priority to EP application Ser. No. 18382451.5 filed Jun. 20, 2018, the disclosure of which is hereby incorporated in its entirety by reference herein.

TECHNICAL FIELD

The present disclosure relates to speckle detection systems for detecting one or more speckles on a surface of an optical element of an image capturing device. The present disclosure further relates to image capturing devices including such speckle detection systems and methods for detecting one or more speckles on a surface of an optical element of an image capturing device.

BACKGROUND

Passenger vehicles are increasingly equipped with camera-based assistance systems. These systems capture the surrounding environment of the vehicle, and provide a variety of functions for improving driving safety and comfort. The functionality of these systems is based on the analysis of the recorded image data. Therefore, the quality of the camera-based assistance systems may be directly related to the quality of the image data.

A dirt-free or speckless optical element is necessary for achieving optimal image quality. The presence of dirt or speckles on an optical element, e.g., an "external" lens or a lens cover of a camera acts as an impediment to light passing through the optical element into the camera, and thus, an image captured by the camera with dirt on the optical element may not represent a true image within the field of view of the camera which should have been captured by the camera. The optical element may become dirty as a result of, e.g., dust accumulation, mud splashes, malicious paintings, etc. Other impediments to light passing through the lens of a camera are water droplets, frost, snow and the like.

In vehicle mounted cameras, the presence of such impediments to light passing through an optical element into a camera leads to inaccurate images being displayed on a visual display screen, for example, a dashboard mounted visual display screen which is provided for presenting images captured by such a vehicle mounted camera to the driver. Such images, depending on where the camera is mounted on the vehicle, may be plan view images of an area adjacent one or both sides of the vehicle or a plan view image to the rear or front of the vehicle, which in general, are provided for assisting the driver to maneuver the motor vehicle in a confined space.

An on-board camera may also be used as a rear-view mirror. In this case, captured images are showed on a display that may be viewed by the driver when the driver is in driving position. A car may have at least two rear-view mirrors of this type (with corresponding camera). It is important also in these rear-view mirror systems that images captured by the camera are reasonably clean or speckless.

In this respect, if such images are obscured or partly obscured, or distorted by the presence of dirt, water droplets or the like on an optical element, the driver may be presented with a false image of the area adjacent the car, which can have catastrophic results, for example, driving the vehicle into an object, or more seriously, striking a pedestrian.

Arrangements for the detection of dirt particles located on the outside of a lens forming part of a vehicle headlight system have been presented in the past. However, in these arrangements, the purpose is to detect obstructions for the light originating from the headlight system. The incident light from the environment or from the sun is not an issue. In fact, the purpose of the headlight systems is to illuminate, e.g., a road in nighttime conditions i.e., when no sunlight is present. Thus, dirt particles during daytime are not affecting the performance of such headlight systems. As a result, such solutions are not suitable for applications that require lenses, e.g., camera lenses of image capturing devices, unobstructed during any time of day.

In examples of the present disclosure, at least some of the aforementioned problems are at least partially resolved.

SUMMARY

In a first aspect, a speckle detection system for detecting one or more speckles on a surface of an optical element of an image capturing device is provided. The system comprises one or more light sources configured to emit a light beam towards the optical element. The optical element being configured to reflect light from the light sources when speckles are located on the surface of the optical element. The system further comprises one or more light receivers configured to receive the light beam reflected by the optical element such that speckles on the surface of the optical element are detected.

According to this first aspect, a speckle detection system that is configured to provide the function of detecting speckles on a surface of an optical element of an image capturing device is provided. Speckles on a surface of an optical element of an image capturing may be due to a diversity of reasons, such as, e.g., dust accumulation, mud splashes, malicious paintings, etc.

In this respect, a light beam is emitted towards the optical element using the light sources. If no speckles are present on the optical element, the emitted light will simply pass through the optical element and thus it may be lost to the exterior of the optical element. However, if speckles are present on the optical element, the emitted light is reflected by the optical element at the position of the speckles. The reflected light may be received by the light receivers. Speckles on the surface of the optical element are thus detected. In summary, by the simple operation of emitting a light beam towards the optical element and detecting the light beam reflected by the optical element, speckles can be easily detected from a surface of the optical element.

This way, a speckle detection system that is simple, cost-effective, and versatile and that can be used effectively with all types of optical elements and or image capturing devices is provided.

In some examples, the light emitting diodes may comprise an emission wavelength centered on absorption bands of the atmosphere. Optionally, the emission wavelength centered on absorption bands of the atmosphere comprises a wavelength at or near: 780 nm, 940 nm, 1130 nm, 1400 nm, 1900 nm or a wavelength below 400 nm. In some other examples, a wavelength below 300 nm may be provided.

By providing light emitting diodes with an emission wavelength centered on absorption bands of the atmosphere, the procedure for detecting one or more speckles on a surface of an optical element of an image capturing device may be inherently improved. Some types of electromagnetic radiation easily pass through the atmosphere, while other types do not. The atmosphere gases may absorb radiation in certain wavelengths while allowing radiation with differing wavelengths to pass through.

The light emitting diodes may comprise an emission wavelength centered on absorption bands of the atmosphere. At those wavelengths, the atmosphere may absorb the electromagnetic radiation coming from, e.g., the sunlight. The sunlight reaching the light receivers may thus be reduced. As a result, all (or almost all of) the electromagnetic radiation received by the light receivers will be related to the light beam emitted by the light emitting diodes and reflected by the optical element. The detection of speckles may thus be improved.

In some examples, the speckle detection system includes a housing that extends longitudinally from a first end to a second end. The housing, in turn, comprises a bottom surface disposed at or near the second end, one or more sidewalls including an inner surface, and a space being formed in an interior of the housing. In examples, the housing is a barrel. The optical element is disposed in the space formed in the interior of the housing at or near the first end of the housing.

In some examples, the light source (e.g. a LED) comprises a coupling surface for attaching the light source to the inner surface of one of the sidewalls forming part of the housing and/or the bottom surface of the housing, particularly in the space formed between the optical element and the one or more internal optical elements. Similarly, the light receiver comprises a coupling surface for attaching the light receiver to the inner surface of one of the sidewalls is located in the inner surface of one sidewall and/or the bottom surface of the housing, particularly in the space between the optical element and the one or more internal optical elements.

In some examples, the system may further comprise a first optical fiber extending from a first end to a second end and a second optical fiber extending from a first end to a second end, wherein, in use, the first end of the first optical fiber is located at or near one light source and the second end of the first optical fiber is located at or near the inner surface of one sidewall of the housing or the bottom surface in a space between the optical elements and the one or more internal optical elements. The first end of the second optical fiber is located at or near one light receiver and the second end of the second optical fiber is located at or near the inner surface of one of the sidewalls of the housing or at or near the bottom surface of the housing, in a space between the optical element and the one or more internal optical elements.

In this respect, the use of fiber optics provides great flexibility in the positioning of the light sources and the light receivers. Particularly, the distance between the optical element at which speckles may be detected and further optical elements of the image capturing device may be small. It may thus be difficult to locate the light sources and the light receivers between such optical elements. However, by simply using optical fibers, the light sources and the light receivers may be placed in several location, e.g., outside the housing. The number of possible integration geometries of such light sources and light receivers in the image capturing device may thus be increased.

In yet another aspect, a method for detecting one or more speckles on a surface of an optical element of an image capturing device is provided. The method comprising: emitting a light beam towards an inner surface of the optical element using one or more light sources. The light sources comprise an emission wavelength centered on absorption bands of the atmosphere, and optionally the emission wavelength centered on the absorption bands of the atmosphere comprises a wavelength at or near 780 nm, 940 nm, 1130 nm, 1400 nm, 1900 nm or a wavelength below 400 nm. The method further comprising detecting a beam reflected by the inner surface of the optical element using one or more light receivers and determining that speckles are located on the surface of the optical element.

In examples, the emission wavelength centered on the absorption bands of the atmosphere comprises a wavelength below 300 nm.

BRIEF DESCRIPTION OF THE DRAWINGS

Non-limiting examples of the present disclosure will be described in the following, with reference to the appended drawings, in which.

DETAILED DESCRIPTION

Figure 1:
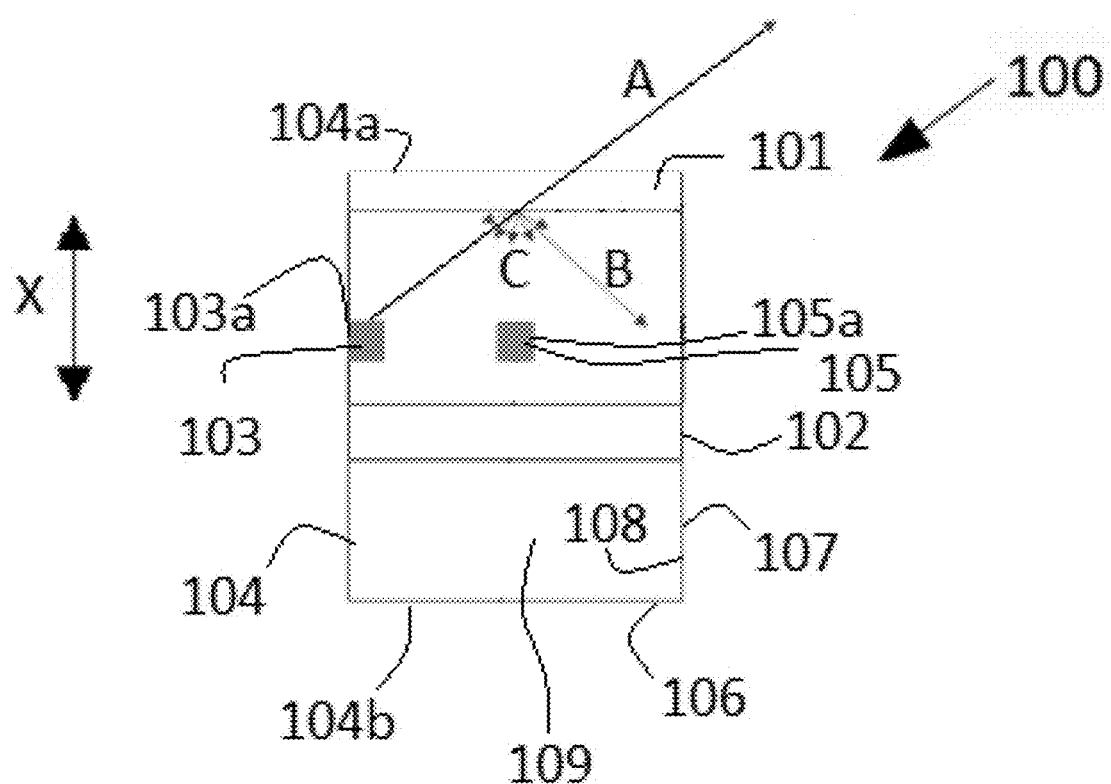
FIG. 1 schematically illustrates an example of a speckle detection system for detecting one or more speckles on a surface of an optical element of an image capturing device.

FIG. 1 schematically illustrates an example of a speckles detection system for detecting one or more speckles obstructing light incident on an external surface of an optical element of an image capturing device. The system 100 may comprise an image capturing device (e.g. a camera) which may be configured to capture images (e.g. photos, videos) of an environment through a corresponding optical element such as lens 102. In some examples, further lenses may be provided. The camera may be, e.g., a detection/vision camera in a vehicle aimed at detecting obstacles, a camera configured to monitor other systems of the vehicle, a driving assistance camera, rear-view mirror system, etc. Such vision systems may be suitable for vehicles of any type and movable on any medium, such as, e.g., roadways, railways, boats, airplanes, cars, etc.

The camera may be any suitable type of image capture device. It may be a camera of the type commonly referred to as a digital camera, or the camera may be commonly referred to as an analogue camera. Such digital and analogue cameras may be, for example, Complementary Metal Oxide Semiconductor (CMOS) cameras, charged coupled device (CCD) cameras and the like. A typical CMOS digital camera may be a CMOS camera producing image frames of 640 pixels in the X direction and 480 pixels in the Y direction, at a rate of, for example, thirty image frames per second.

In case of a passenger vehicle, the camera may be mounted in any desired location on the vehicle, for example, the camera may be mounted to the rear of the motor vehicle for capturing images to the rear of the motor vehicle for displaying on a visual display screen, for example, a dashboard mounted visual display screen for presenting images captured by the camera to a driver of the vehicle. Such rearward images may be downwardly looking plan view images of an area to the rear of the motor vehicle for use in assisting the driver to carry out reverse manoeuvring of the vehicle in a confined space, or the rearward images may be images looking in a generally rearward direction from the vehicle.

In examples, the camera may be mounted on a side mirror of the motor vehicle for capturing a downward looking plan view image of the ground adjacent the side of the vehicle for display on the display screen, and also for assisting the driver in carrying out manoeuvring of the vehicle in a confined space, for example, for parking, and in particular, parking the vehicle parallel to a curb. In some other examples, the camera may also be located to the front of the vehicle for capturing a downward looking plan view of the ground adjacent the front of the vehicle, or for capturing an image looking in a generally forward direction from the vehicle. The mounting and operation of such cameras is well known to those skilled in the art.

The camera may capture image data and it may provide the image data to a further processing device for processing the image data. In particular, the image data may be provided in form of image frames. The camera may capture image data in form of frames having a predetermined resolution. In examples, camera may capture frames in regular time intervals.

In some examples, the processing device may be arranged locally with respect to the camera. In particular, the processing device may be internal to the camera. In other examples, the processing device may be a cloud system connectable with the camera through suitable connection. In still other examples, the processing device may be a remote system connectable with the camera through a communications network, such as e.g. the Internet. In this case, corresponding connection between camera and network and corresponding connection between network and remote system may be implemented.

In any of the above-mentioned applications of the camera and others, an optical element 101 may be provided. The optical element may be, e.g., a plastic or glass external cover of the camera configured to protect the camera against external elements such as dust, water, etc. In some other examples, the optical element may be an internal glass/plastic optical element forming part of the camera, e.g., a cover of a lens barrel or a lens itself. In any case, such optical element may become dirty due to, e.g., dust accumulation, mud splashes, malicious paintings, etc. As a result, the image areas covered by this contamination do not provide appropriate image data for a further processing, in particular for use in Advanced Driver Assistance Systems (ADAS).

Particularly, when dirtiness of the optical element 101 is excessive, the camera may produce images of insufficient quality. Therefore, it may be a concern to determine when the optical element 101 becomes excessively dirty in order to undertake corresponding corrective action(s), such as, e.g., activation of an automatic cleaning system, triggering of an alarm for manual cleaning, etc.

The system may further comprise a housing 104, such as a barrel, which may be e.g. a plastic or aluminum injection molded part. In this example, the barrel 104 may comprise a substantially circular cross-section although some other shapes of the cross-section may be possible. The barrel extends longitudinally from a first end 104a to a second end 104b. The barrel 104 may comprise a bottom surface 106, a circular sidewall 107 including an inner surface 108 and a space 109 being formed in an interior of the circular barrel 104. In some other examples, the housing 104 may be a housing of the camera or a protective external element of such camera as will be explained later on with reference to FIG. 3 or FIG. 4.

The barrel 104 is configured and sized to position and align components of the system. For example, the barrel 104 may include mounting features sized and configured to engage with and position a plurality of internal optical system elements such as one or more fixed lenses, shutter system elements, covers and the like. In this example, the internal optical element 102, e.g., a lens and the external optical element 101 of the capturing device may be fixed (directly or indirectly) to the inner surface 108 of the barrel 104. The lens 102 may be spaced apart a predetermined distance x with respect to the optical element 101.

The optical element 101, e.g., a cover and the lens 102 may be substantially circular-shaped although some other shapes may be possible. The optical element 101 may be coupled to the inner surface 108 of the barrel 104 at or near its distal end 104a, thus, in use, the optical element closes off the top of the barrel 104. The cover 101 may have, e.g., a threaded coupling with the top of the barrel 104.

In examples, the optical element 101 may comprise a grip (not shown) located, e.g., at the outer part of the sidewall of the optical element, thus the attachment, removal and manipulation of the optical element 101 may be improved. The grip may be shaped so that it may be easily held between the fingers of a user. The grip may also be formed by a certain surface roughness, optionally provided by a coating. With this arrangement, the optical element 101 may be efficiently manipulated. Although FIG. 1 illustrates the barrel 104 as a single piece, it need not be.

Additionally, one or more light sources 103 may be provided. The light sources 103 may be configured to emit a light beam towards an inner surface of the optical element 101. The light sources 103 may employ, e.g., one or more light-emitting diodes or other suitable light sources. Moreover, one or more light receivers 105 may be provided. The light receivers may be, e.g., a photodiode or a phototransistor.

The light receiver may further comprise broadband detectors including ultra-violet detectors (configured to detect light under 400 nm) and/or infrared detectors (configured to operate over 700 nm), depending on the light source wavelength. The broadband detectors may be configured to detect light wavelengths between 200 nm and 1100 nm. For broadband detectors, the most common and affordable material may be silicon, however some other material may be considered. For broadband detectors configured to detect wavelengths higher than 1100 nm, the chosen material may be Indium gallium arsenide (InGaAs).

In examples, a diameter may be defined in a cross-section of the housing with the light sources and the light receivers may be placed along said diameter. In further examples, a first diameter and a second diameter may be defined in a cross-section of the housing. The first diameter may be arranged at an angle of 90 degrees with respect to the second diameter. The light sources may be arranged, e.g., at a first end of the first diameter and the light receivers may be arranged, e.g., at a first end of the second diameter. With such an arrangement, the light receivers may not receive directly the reflected light but instead the light receivers may receive scattered light.

The light-emitting diodes 103 may comprise an emission wavelength centered on the atmosphere absorption bands. The emission wavelength centered on the atmosphere absorption may comprise a wavelength in a range between 740 nm and 820 nm, 900 nm and 980 nm, 1090 nm and 1170 nm and between 1360 nm and 1440 nm. In particular, in a range between 760 nm and 800 nm, 920 nm and 960 nm, 1110 nm and 1150 nm and 1380 nm and 1420 nm. More particularly, in a range between 770 nm and 790 nm, 930 nm and 950 nm, 1120 nm and 1140 nm and between 1390 and 1410 nm.

In examples, the emission wavelength centered on the atmosphere absorption may comprise a wavelength at or near 780 nm, 940 nm, 1130 nm, 1400 nm or a wavelength below 400 nm (particularly below 300 nm).

In examples, the light emitting diodes (LEDs) may be configured to emit light with one of the following bandwidths: 40 nm, 20 nm or 10 nm. In further examples, the bandwidth may be ±15 nm.

As will be explained later on with reference to FIG. 5, particles and gases in the atmosphere may affect the incoming sunlight and radiation. Particularly, molecules in the atmosphere may absorb energy at various wavelengths. Ozone, carbon dioxide, and water vapour are the three main atmospheric constituents which absorb radiation. Because these elements absorb electromagnetic energy in very specific regions of the spectrum, they influence where (in the spectrum) may be "looked" for sensing purposes.

It is noted that emitting light in the electromagnetic spectrum that is visible to the human eye, e.g., between 300 nm and 780 nm may interfere with the image captured by the camera. Therefore, the light source may avoid the emission of light centered on the wavelength between 300 nm and 780 nm. Instead, by providing light emitting diodes with an emission wavelength centered on the atmosphere absorption bands, the atmosphere may absorb the electromagnetic radiation coming from the sunlight.

As commented above, the light-emitting diodes 103 may emit light with a wavelength at or near 780 nm, 940 nm, 1130 nm, 1400 nm, 1900 nm or a wavelength below 400 nm. At those wavelengths, the atmosphere absorbs much of the energy coming from the sun. The sunlight reaching the light receivers may thus be reduced. As a result, all (or almost all of) the electromagnetic radiation received by the light receivers will be related to the light beam emitted by the light emitting diodes and scattered by the speckle on the optical element. False positives in the detection of speckles may thus be avoided and the detection of speckles in a surface of an optical element may be inherently improved.

It is thus clear that, measuring at those wavelengths by the light receivers 105 may reduce the ambient light reaching the light receivers 105. The reliability in the measurements may thus be improved.

The light sources 103 may comprise a coupling surface 103a for mounting the light sources 103 to the inner surface 108 of any of the above-commented types of housings. The light sources 103 may be removably mounted to the inner surface 108 of the barrel. In examples, the light sources 103 may be integrally formed with the barrel 104.

Similarly as the light sources, the light receivers 105 may comprise a coupling surface 105a for mounting the light receivers 105 to the inner surface 108 of the barrel. The light receivers 105 may be removably mounted to the inner surface 108 of the barrel. In examples, the light receivers 105 may be integrally formed with the barrel.

In examples, the coupling surfaces 103a, 105a may be wider than the corresponding light sources 103 and/or light receivers 105 and thereby provide more surface area for the coupling surface. In consequence, an improved attachment of the light sources 103 and/or to the light receivers 105 to the inner surface 108 of the barrel 104 is achieved.

In some examples, the coupling surfaces 104a, 105a of the corresponding light sources 103 and/or light receivers 105 may further be provided with an adhesive for sticking the light sources 103 and/or the light receivers 105 to the inner surface 108 of the barrel. The procedure to attach and/or remove the light sources 103 and/or the light receivers 105 from the inner surface 108 of the barrel may thus be improved.

In examples, a plurality of light sources 103 and a plurality of light receivers 105 may be provided. Increasing the amount of light sources 103 and light receivers 105 may increase the signal-to-noise ratio (SNR). False positives in the determination of speckles by the system may thus be avoided.

A steering mechanism adapted to control an orientation of the light sources 103 (and thus the light beam emitted by the light sources) with respect to the connection element 103a may be provided. The emitted light beam may thus be oriented at the desired position. This is particularly useful in examples when the emitted light beam comprises a high dispersion. However, in examples where the light comprises a low dispersion, the steering mechanism may not be needed.

As commented above, the internal optical element 102, for example, a lens may be spaced apart a predetermined distance x with respect to the optical element 101. In examples where the optical element 101 is a lens and the internal optical element 102 is a further lens, the distance x may be less than 1.5 mm. However, in examples where the optical element 102 is a camera's cover, the distance may be, e.g., between 1 cm and 2 cm with respect to the internal optical element 102.

In any case, the light sources 103 and the light receivers 105 may be suitably located between the lens and the optical element 101. By providing a suitable space x between the optical element 101 and the lens 102, the emitted light beam may be easily directed to the desired position of an inner surface of the optical element using the above-commented steering mechanism such that the reflected light beam is not directly received by the light receiver. In this respect, the light receiver may receive the scattered light reflected by the speckles. Additionally, the atmosphere may absorb the electromagnetic radiation coming from the sunlight in a substantially similar manner as hereinbefore described. Thus, by reducing the direct light reflected by the speckles and the ambient light reaching the detector, the detection of speckles may be improved.

In some examples, the coupling surfaces 103a, 105a of the corresponding light sources 103 and/or light receivers 105 may further be provided with an adhesive for sticking the light sources 103 and/or the light receivers 105 to the inner surface 108 of the barrel. The procedure to attach and/or remove the light sources 103 and/or the light receivers 105 from the inner surface 108 of the barrel may thus be improved.

The system 100 may further comprise an ambient light detector (not shown) configured to sense light outside the housing 103. The reflected light beam may be received by the light receivers 105 together with ambient light. The signal produced by the sensed ambient light may be subtracted from the signal produced from the reflected light beam comprising the emitted light beam and the ambient light such that only the reflected light beam received by the receiver is counted for (and thus noise is removed from the signal). The signal-to-noise ratio (SNR) may thus be increased.

In some other examples, the system may comprise a lock-in amplifier which is a type of amplifier that can extract a signal with a known carrier wave from a noisy environment. The lock-in amplifier may perform a multiplication of its input with a reference signal, and then lock-in amplifier may apply an adjustable low-pass filter to the result.

In this respect, such circuit may be used to mitigate the effect of ambient light. For example, when the light sources do not emit light, the light received by the light receivers may only be the ambient light. The system may thus set up this signal as a "reference signal". In this way, as shown here, the "reference signal" itself may be used to modulate a signal corresponding to the light received by the light receivers when light is reflected from the speckles. Following the example, when the light sources do emit light, the lock-in amplifier may extract a useful signal of the signal corresponding to the light received by the light receivers using the "reference signal". Hence, any ambient light is subtracted and removed from the received light.

In accordance with an aspect, the speckles can be detected from a surface of the optical element 101 substantially as follows:

The light sources 103 may emit a light beam towards the optical element 101 in the direction of the arrow (arrow A). When the optical element 101 is clean i.e. no dirt particles or speckles are present on the optical element 101, for example, in the form of water droplets, dust, etc. The emitted light beam may simply pass through the optical element 101 and thus it may be lost to the exterior of the optical element.

However, when, e.g., dirt particles or speckles are present on the optical element 101, the emitted light beam will be reflected at the location of the dirt particles in the direction of the arrows (arrows C). The emitted light beam will thus no longer pass through the optical element (arrow A) but instead the light beam will be reflected (scattered) in the direction of the arrows (arrows C) by the optical element 101 at the position of the dirt particles.

At this stage, the reflected beam may be received by the light receivers 105. If a reflected beam is received by the light receivers 105, it is determined that the optical element 101 is excessively dirty. A corresponding corrective action (s), e.g., activation of an automatic cleaning system, triggering of an alarm for manual cleaning, etc. may be performed in response to such determination. It is noted that the light received by the receivers is the light reflected and scattered by the dirt particles (arrow C) instead of the specular reflection (see arrow B).

In examples, an unwanted reflection of the emitted beam may be reflected by the optical element 101 itself, even when no speckles are present over the optical element 101. In examples where the optical element 101 is provided without any antireflection coating, the unwanted reflected beam may be 4% of the light beam emitted by the light sources 103.

In some other examples, an antireflection coating may be used in the optical element 101. Antireflection coatings are well known and are extensively used on the surfaces of optical element, for example, lenses or covers to reduce unwanted reflection. Generally, it may be desirable that the coating reduces the surface reflectance to an extremely low value over an extended spectral region so as to maintain proper color balance and to be most efficient.

In any case, the light receiver 105 may be configured to avoid the detection of such unwanted reflection. Therefore, even if an unwanted reflected beam may be received by the light receivers 105, the system may determine that no speckles are present on the optical element. The corresponding corrective action(s) may thus not be activated in case of such unwanted reflection is received. False positives in the determination of speckles over the optical element may thus be avoided.

Figure 2:
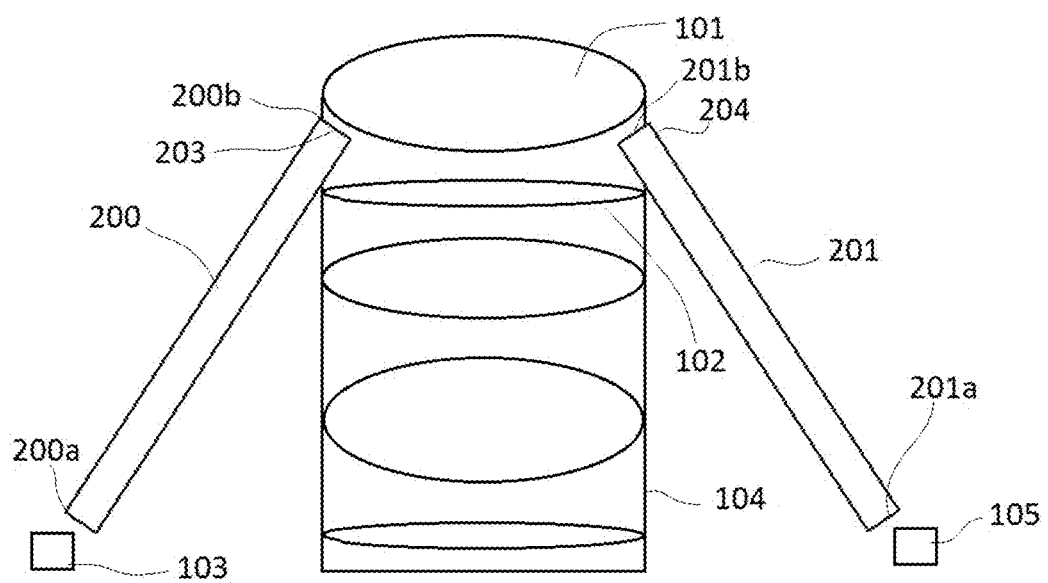
FIG. 2 schematically illustrates another example of a speckle detection system for detecting one or more speckles on a surface of an optical element of an image capturing device, and the speckles detection system includes a first optical fiber and a second optical fiber.

FIG. 2 schematically illustrates another example of a speckles detection system for detecting one or more speckles on a surface of an optical element of a camera, wherein the system includes a first optical fiber and a second optical fiber. Same reference numbers denote the same elements as those in the previous figure. The system shown in FIG. 2 differs from the system shown in FIG. 1 only in that a first optical fiber 200, a second optical fiber 201 and another example of a housing are included. The structure and operation of the remaining components of the system may substantially be the same as hereinbefore described.

As commented above, the system may be provided with the optical element 101 and an internal optical element 102. A distance x may be defined between both optical element 101, 102 in a substantially similar manner as hereinbefore described.

The space between the optical element 101 and the optical element 112 may not be sufficient to properly place the light emitters and the light detectors. In this respect, the inventors have found that the light emitters 103 and the light receivers 105 may be located outside the housing 104 using optical fibers.

Particularly, the first optical fiber 200 may extend from a first end 200a to a second end 200b. The first end 200a of the first optical fiber 200 is located at or near a light source 103.

The housing 104 may be provided with an orifice 203. The first optical fiber 200 in question can thus be inserted in the orifice 203 and be advanced until the first optical fiber 200 enters a space created inside the barrel. In examples, the second end 200b of the optical fiber 200 may be provided at or near one of the sidewalls forming part of the housing or near the bottom surface of the housing (which in this example may be the optical element 102). In any case, the second end 200b of the fiber may be provided in the space formed between the external optical element 101 and the further optical element 102. The emitted light beam may thus be transmitted via the optical fiber 203 towards the optical element 101.

Similarly, as the first optical fiber, the second optical fiber 201 may extend from a first end 201a to a second end 201b. The first end 201a of the second optical fiber 201 may be located at or near the light receivers 105. The housing 104 may be provided with a second orifice 204. The second optical fiber 201 in question can thus be inserted into the orifice 204 and be advanced until second optical fiber 201 enters a space created inside the barrel. In examples, the second end of the optical fiber may be provided at or near one of the sidewalls forming part of the housing or near the bottom surface of the housing (which in this example may be the optical element 102). In any case the second end 200b of the fiber may be provided in the space formed between the external optical element 101 and the further optical element 102. The reflected light beam may thus be received via the optical fiber 201 towards the receivers 105

The speckles can thus be detected in a substantially similar way as hereinbefore described.

With such an arrangement, the light emitter 103 and the light receiver 105 may be located, e.g., outside the barrel or outside the camera housing. A great flexibility in the positioning of the light emitter 103 and the light receiver 105 may thus be achieved.

Figure 3:
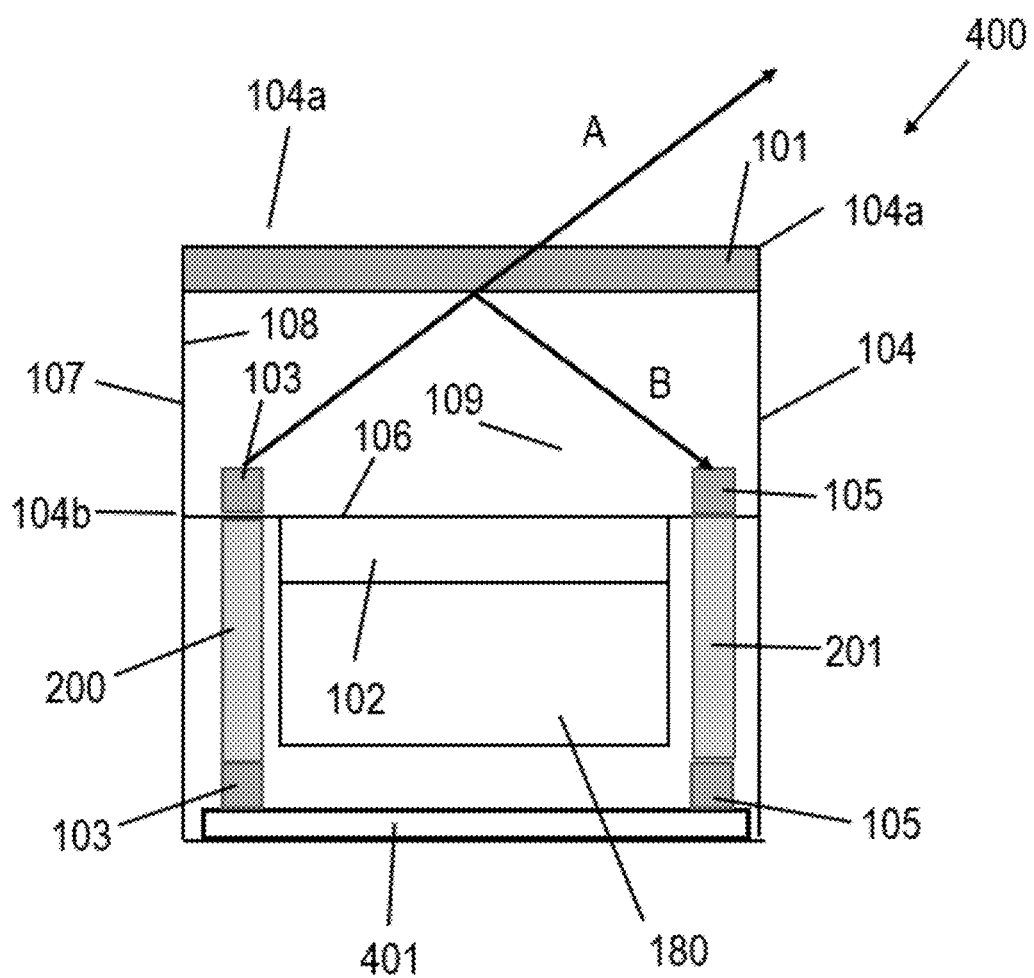
FIG. 3 schematically illustrates a further example of a speckle detection system for detecting one or more speckles on a surface of an optical element of an image capturing device, FIG. 4 schematically illustrates another example of a speckle detection system for detecting one or more speckles on a surface of an optical element of an image capturing device, and FIG. 5 schematically illustrates an example of the atmospheric absorption at sea level of different gases

FIG. 3 schematically illustrates another example of a speckle detection system for detecting one or more speckles on a surface of an optical element of an image capturing device. The system 400 shown in FIG. 3 differs from the system shown in FIG. 1 in that a housing is provided, wherein the housing is a protective external element of an image capturing device and the light emitter and the light detector are located over a bottom surface of the housing. The structure and operation of the remaining components of the system may substantially be the same as hereinbefore described.

In this example, an optical element 101 may be provided. The optical element 101 may be, e.g., an external cover of a camera 180 configured to protect the camera 180 against external elements such as dust, water, etc. A lens 102 forming part of a camera 108 may further be provided. The lens may be spaced apart a predetermined distance X with respect to the optical element 101 and it may be provided outside the housing 104.

Similarly, as in previous examples, one or more light sources 103 may be provided. The light sources 103 may be configured to emit a light beam towards an inner surface of the external cover 101 of the camera 180. Moreover, one or more light receivers 105 may be provided. The light sources 103 and the light receivers 105 may be placed between the optical element 101 and the lens 102, inside a space defined by the housing 104.

The system may further comprise the above-commented housing 104. The housing 104 may extend longitudinally from a first end 104a to a second end 104b. The housing 104 may comprise a bottom surface 106, a sidewall 107 including an inner surface 108 and a space 109 being formed in an interior of the housing 104.

The light sources 103 and the light receivers 105 may be located over the bottom surface 106 of the housing 104. The system 400 includes the first optical fiber 200 and the second optical fiber 201 and a PCB 401 positioned below the light sources 103 and the light receivers 105.

In accordance with a further aspect, the speckles may be detected from a surface of the external cover 101 in a substantially similar manner as hereinbefore described.

Figure 4:
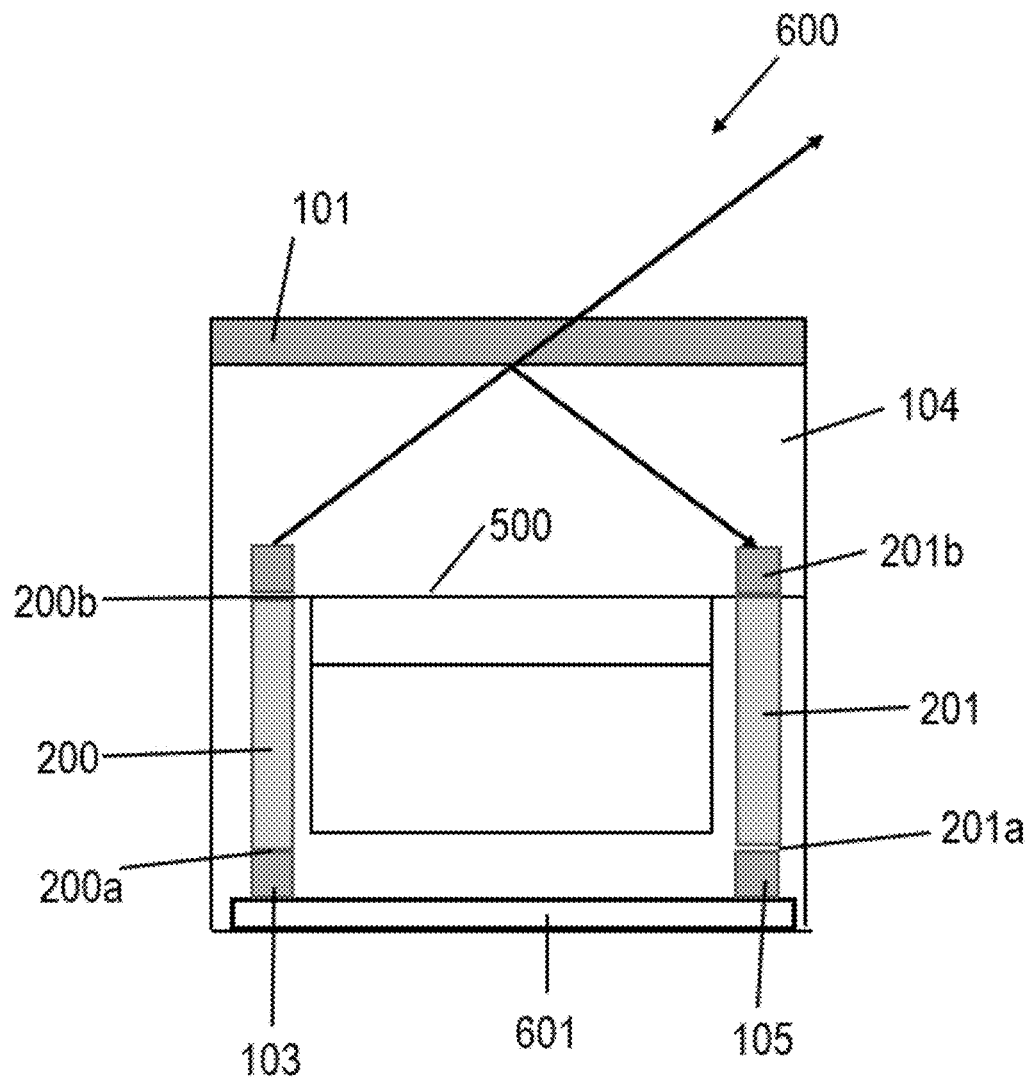

FIG. 4 schematically illustrates another example of a speckle detection system for detecting one or more speckles on a surface of an optical element of an image capturing device. The system 600 shown in FIG. 4 differs from the system shown in FIG. 3 in that a first optical fiber 200, a second optical fiber 201 are provided and the light emitter and the light receptor are located outside the housing. The structure and operation of the remaining components of the system may substantially be the same as hereinbefore described.

The system may be provided with the optical element 101. The space between the optical element 101 and a bottom part 500 of a housing may not be sufficient to properly place the light emitters and the light detectors. In this respect, the light emitters 103 and the light receivers 105 may be located outside the housing 104 using optical fibers.

The light emitters and the light receivers may be electrically connected to a printed circuit board (PCB) 601 using, e.g., electrical pins. As such, the PCB 601 may supply power and control the light emitters and light receivers. In this particular example, a single PCB 601 may be provided for the light emitters and light receivers. The PCB may further comprise e.g. an image sensor. In examples, the PCB may form part of the image capturing device. However, in some other examples, the PCB may be specifically designed to connect the light emitters and the light receivers.

In some other examples, instead of a single PCB, a first PCB (not shown) and a second PCB (not shown) may be provided. The light emitter may thus be electrically connected to the first printed circuit board and the light receiver may be electrically connected to the second printed circuit board.

Particularly, the first optical fiber 200 may extend from a first end 200a to a second end 200b. The first end 200a of the first optical fiber 200 is located at or near a light source 103.

The housing 104 may be provided with an orifice. The first optical fiber 200 in question can thus be inserted in the orifice and be advanced until the first optical fiber 200 enters a space created inside the housing. In examples, the second end 200b of the optical fiber 200 may be provided at or near one or near the above-commented bottom surface of the housing, in the space formed between the optical element 101 and such bottom part of the housing. The emitted light beam may thus be transmitted via the optical fiber 203 towards the optical element 101 via an emission point which may be at or near the end 200b of the fiber.

Similarly as the first optical fiber, the second optical fiber 201 may extend from a first end 201a to a second end 201b. The first end 201a of the second optical fiber 201 may be located at or near the light receivers 105. The housing 104 may be provided with a second orifice. The second optical fiber 201 in question can thus be inserted into the orifice 204 and be advanced until the second optical fiber 201 enters a space created inside the housing 104. The second end of the optical fiber may be provided at or near the bottom surface 500 of the housing 104, in the space formed between the optical element 101 and such bottom surface. The reflected light beam may thus be received via the optical fiber 201 (particularly a reception point of the fiver coincident with an end 201b of the fiber) towards the receivers 105.

The speckles can thus be detected in a substantially similar way as hereinbefore described.

Figure 5:
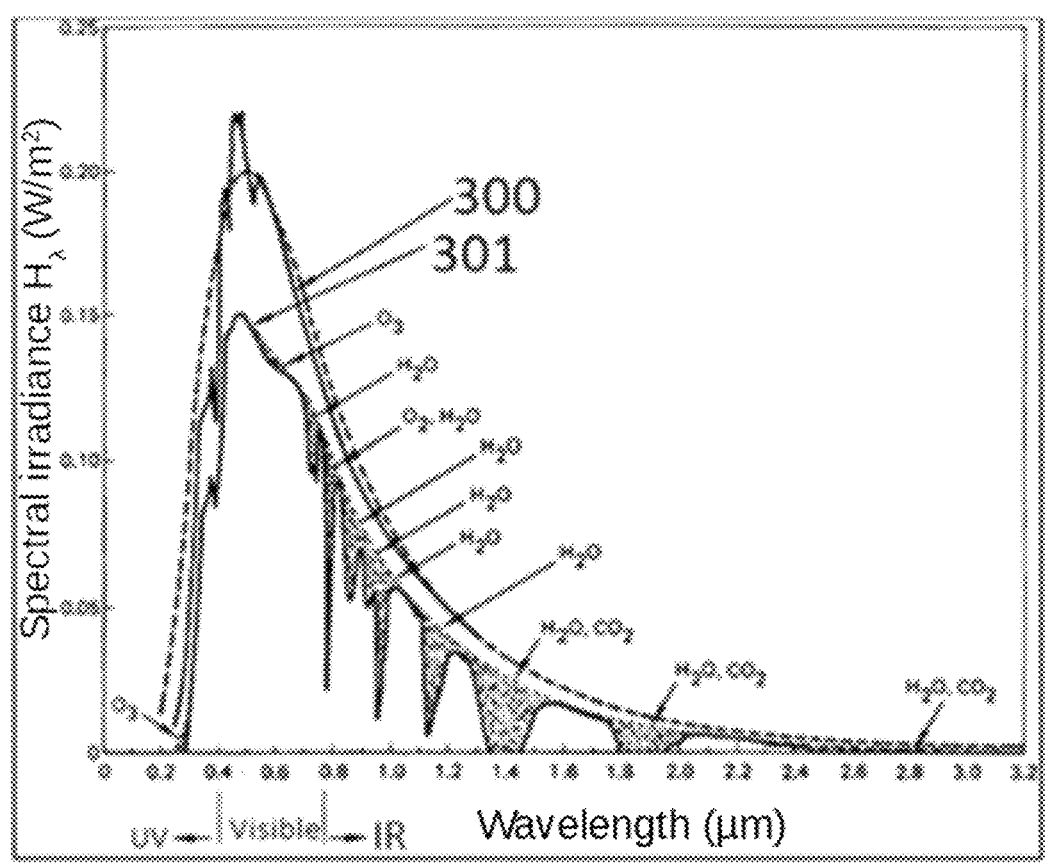

FIG. 5 schematically illustrates an example of the atmospheric absorption at sea level of different gases. In this figure, the spectral irradiance $H_\lambda$ received from the Sun is illustrated as a function of wavelengths. The spectral irradiance of a wavelength spectrum is measured in watts per square meter ($W/m^2$).

The spectral solar irradiation outside the atmosphere may be described as following the curve 300. The curve 301 shows the spectral solar irradiation at the sea level. The curve 301 shows that the absorption of solar radiation by the atmosphere due to atmosphere constituents may be significant at the wavelengths 0.780 μm (780 nm), 0.940 μm (940 nm), 1.130 μm (1130 nm), 1.400 μm (1400 nm), 1.900 μm (1900 nm) or a wavelength below 0.400 μm (400 nm) (particularly below 0.300 μm (300 nm)) at the sea level. Light may thus be emitted by light sources at those wavelengths. Measuring at those wavelengths may reduce the ambient light reaching the detector.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

What is claimed is:

1. An image capturing device for a vehicle comprising:
   a housing that includes a barrel extending longitudinally from a first end to a second end, the barrel comprising a bottom surface disposed at or near the second end, one or more sidewalls including an inner surface and a space being formed in an interior of the barrel;

an external optical element and an internal optical element, wherein the external optical element is disposed in the space formed in the interior of the barrel at or near an outer end of the barrel away from the internal optical element which is positioned closer to the bottom surface, and wherein the external optical element is axially spaced from the internal optical element;

a printed circuit board (PCB) further comprising an image sensor such that the image capturing device is configured to capture images outside the vehicle which are displayed on a display device that is viewed by a driver; and a system for detecting one or more speckles on a surface of the external optical element, the system comprising:

one or more light sources configured to emit a light beam towards the external optical element, the external optical element being configured to reflect light from the light sources when speckles are located on the surface of the external optical element, and one or more light receivers configured to receive the light beam reflected by the external optical element such that speckles on the surface of the external optical element are detected;

wherein the system further comprises a first optical fiber extending from a first end to a second end and further extending past the internal optical element and toward the external optical element and a second optical fiber extending from a first end to a second end further extending past the internal optical element and toward the external optical element, wherein, in use, the first end of the first optical fiber is located at or near the light sources to transmit the light beam via the first optical fiber toward the external optical element; and the first end of the second optical fiber is located at or near the light receivers to receive the reflected beam via the second optical fiber from the external optical element; and wherein the second end of the first or second optical fiber is located within the barrel and in the space formed between the external optical element and the internal optical element.

2. The image capturing device of claim 1, wherein the one or more light sources comprise a predetermined emission wavelength centered on absorption bands of atmosphere to reduce sunlight being received at the one or more light receivers.

3. The image capturing device of claim 2, wherein the predetermined emission wavelength centered on the absorption bands of the atmosphere in a range of at least one of: 740 nm to 820 nm; 900 nm to 980 nm; 1090 nm to 1170 nm; and 1360 to 1440 nm so as to reduce the sunlight being received at the one or more light receivers.

4. The image capturing device of claim 1, wherein at least one of the one or more light sources or the one or more light receivers are located outside the space formed in the interior of the housing.

5. The image capturing device of claim 1, wherein a first diameter and a second diameter are defined in a cross-section of the housing, wherein the first diameter is arranged at an angle of 90 degrees with respect to the second diameter, and wherein the one or more light sources are located at an end of the first diameter and the one or more light receivers are located at an end of the second diameter or the one or more light sources and the one or more light receivers are placed along the first diameter.

6. The image capturing device of claim 5 further comprising an ambient light detector configured to sense light outside the housing.

7. The image capturing device of claim 1 further comprising a lock-in amplifier configured to eliminate an ambient light signal included in a measurement signal corresponding to the light beam reflected by the external optical element.

8. The image capturing device of claim 1, wherein the one or more light receivers are ultra violet detectors or near infrared detectors.

9. The image capturing device of claim 1, wherein the external optical element is configured to be transparent to ultraviolet light.

10. The image capturing device of claim 1, wherein the one or more light sources comprise light emitting diodes (LEDs) configured to emit light with a bandwidth of ±15 nm.

11. The image capturing device of claim 1, wherein the PCB comprises a first PCB and a second PCB, wherein the one or more light sources are electrically connected to the first PCB and the one or more light receivers are electrically connected to the second PCB.

12. An image capturing device for a vehicle comprising:
a housing that includes a barrel having a space and the barrel extending from a first end to a second end, the barrel comprising a bottom surface disposed at or near the second end;

an external optical element and an internal optical element, wherein the external optical element is disposed in the space formed in an interior of the barrel at or near an outer end of the barrel, and wherein the external optical element is axially spaced from the internal optical element;

a printed circuit board (PCB) further comprising an image sensor such that the image capturing device is configured to capture images outside the vehicle; and a system for detecting one or more speckles on a surface of the external optical element, the system comprising:

one or more light sources configured to emit a light beam towards the external optical element, the external optical element being configured to reflect light from the light sources when speckles are located on the surface of the external optical element, and one or more light receivers configured to receive the light beam reflected by the external optical element such that speckles on the surface of the external optical element are detected;

wherein the system further comprises a first optical fiber extending from a first end to a second end further extending past the internal optical element toward the external optical element and a second optical fiber extending from a first end to a second end further extending past the internal optical element and toward the external optical element, wherein, in use, the first end of the first optical fiber is located at or near the light sources to transmit the light beam via the first optical fiber toward the external optical element; and the first end of the second optical fiber is located at or near the light receivers to receive the reflected beam via the second optical fiber from the external optical element; and wherein the second end of the first or second optical fiber is located within the barrel and in the space formed between the external optical element and the internal optical element.

13. The image capturing device of claim 12 further comprising a lock-in amplifier configured to eliminate an ambient light signal included in a measurement signal corresponding to the light beam reflected by the external optical element.

14. The image capturing device of claim 12, wherein the one or more light receivers comprise broadband detectors including infrared detectors configured to operate at 700 nm.

15. The image capturing device of claim 14, wherein the one or more light sources generate a predetermined emission wavelength centered on absorption bands of atmosphere in a range of at least one of: 740 nm to 820 nm; 900 nm to 980 nm; 1090 nm to 1170 nm; and 1360 to 1440 nm so as to reduce sunlight being received at the one or more light receivers.

16. A speckles detection system for detecting one or more speckles on a surface of an optical element of an image capturing device, the system comprising:

one or more light sources configured to emit a light beam toward an external optical element via a first optical fiber, the external optical element is positioned on an outer end of a housing and is configured to reflect light from the light sources when speckles are located on the surface of the optical element, one or more light receivers configured to receive the light beam reflected by the optical element via a second optical fiber such that speckles on the surface of the external optical element are detected; and an internal optical element being spaced apart from the external optical element;

wherein the first optical fiber extends from a first end to a second end and further extending past the internal optical element toward the external optical element, wherein a second optical fiber extends from a first end to a second end further extending past the internal optical element toward the external optical element, wherein the one or more light receivers comprise broadband detectors including infrared detectors configured to operate over 700 nm; and wherein the one or more light sources generate a predetermined emission wavelength centered on absorption bands of atmosphere in a range of at least one of: 740 nm to 820 nm; and 900 nm to 980 nm; and 1090 nm to 1170 nm; and 1360 nm to 1440 nm so as to reduce sunlight being received at the one or more light receivers.

* * * * *